US009144046B2

(12) United States Patent
Sousa et al.

(10) Patent No.: US 9,144,046 B2
(45) Date of Patent: Sep. 22, 2015

(54) SYSTEMS AND METHODS FOR SYNCHRONIZING WIRELESS AUDIO BASE STATIONS

(75) Inventors: Alexandre Sousa, Brejos de Azeitao (PT); Antonio Manuel Pedroso, Amoreira-Alcabideche (PT); Martin Bodley, Sudbury, MA (US); Pascal Cleve, Sudbury, MA (US); Jonathan Schau, Sudbury, MA (US)

(73) Assignee: Revo Labs, Inc., Sudbury, MA (US)

( * ) Notice: Subject to any disclaimer, the term of this patent is extended or adjusted under 35 U.S.C. 154(b) by 33 days.

(21) Appl. No.: 13/976,850

(22) PCT Filed: Feb. 22, 2012

(86) PCT No.: PCT/US2012/026153
§ 371 (c)(1),
(2), (4) Date: Jun. 27, 2013

(87) PCT Pub. No.: WO2012/116087
PCT Pub. Date: Aug. 30, 2012

(65) Prior Publication Data
US 2013/0281074 A1    Oct. 24, 2013

Related U.S. Application Data

(60) Provisional application No. 61/445,345, filed on Feb. 22, 2011.

(51) Int. Cl.
*H04M 3/42* (2006.01)
*H04W 56/00* (2009.01)
*H04J 3/06* (2006.01)

(52) U.S. Cl.
CPC ........... *H04W 56/001* (2013.01); *H04J 3/0641* (2013.01); *H04W 56/00* (2013.01); *H04R 2420/07* (2013.01)

(58) Field of Classification Search
CPC .............. H04W 56/00; H04W 56/001; H04W 56/0055; H04W 36/0061; H04W 84/045; H04W 56/0015; H04W 56/002; H04W 56/0005; H04W 76/025; H04W 84/10; H04W 84/105; H04W 84/20; H04W 88/00; H04W 88/023; H04W 92/20; H04R 2420/07; H04J 3/0641; H04J 3/0638; H04J 3/0679; H04J 3/0688; H04J 11/0079; H04L 12/422; H04L 7/00
USPC .................... 455/3.06, 414.4, 62, 63.1, 66.1, 455/410–411, 415–416, 418–420, 434, 455/435.1, 463–464, 500, 508, 511, 513, 455/517–521, 524, 550.1, 553.1, 556.2, 455/558, 561; 370/266–271, 328–329, 338, 370/341, 350, FOR. 113, 395.62, 503, 370/507–510, 512, 514, 520; 379/FOR. 155–FOR. 160; 348/E7.083–E7.084, 500
See application file for complete search history.

(56) References Cited

U.S. PATENT DOCUMENTS 6,542,754 B1 *  4/2003  Sayers et al. .................. 455/502
8,023,495 B1 *  9/2011  van Erven ..................... 370/350

(Continued)

*Primary Examiner* — Meless Zewdu
(74) *Attorney, Agent, or Firm* — Robert Schuler (57) ABSTRACT

Systems and methods for adaptive OTA (over-the-air) synchronization of RF (radio frequency) base stations are described herein. Using these systems and methods, base stations in wireless audio systems can automatically identify externally sourced base station clocks and merge overlapping clock system domains, thereby eliminating the need for complex base station management and network configuration.

8 Claims, 5 Drawing Sheets

(56) References Cited

U.S. PATENT DOCUMENTS

| | | |
|---|---|---|
| 8,175,120 B2 * | 5/2012 | Nelson et al. .................. 370/503 |
| 8,537,716 B2 * | 9/2013 | Gudipudi et al. ............. 370/254 |
| 2002/0114354 A1 * | 8/2002 | Sinha et al. .................... 370/503 |
| 2005/0166079 A1 * | 7/2005 | Lienhart et al. ............... 713/500 |
| 2007/0106404 A1 * | 5/2007 | Chung et al. .................... 700/94 |
| 2009/0168745 A1 * | 7/2009 | Ahmadi et al. ................ 370/350 |
| 2009/0222685 A1 * | 9/2009 | Foster et al. ................... 713/500 |
| 2009/0298420 A1 * | 12/2009 | Haartsen et al. ............. 455/3.06 |
| 2011/0019638 A1 * | 1/2011 | Hamel et al. .................. 370/331 |
| 2011/0090896 A1 * | 4/2011 | Bradley ........................ 370/350 |
| 2011/0170527 A1 * | 7/2011 | Yamamoto et al. ........... 370/338 |
| 2012/0069943 A1 * | 3/2012 | Lim et al. ....................... 375/371 |
| 2012/0201195 A1 * | 8/2012 | Rausch et al. ................ 370/328 |

* cited by examiner

SYSTEMS AND METHODS FOR SYNCHRONIZING WIRELESS AUDIO BASE STATIONS

FIELD

The present invention relates to systems and methods for synchronizing a clock used by multiple Radio Frequency (RF) base stations.

BACKGROUND

Audio conferencing has grown in popularity. Commonly, audio systems use a tabletop microphone to detect input from conference participants. Participants must therefore gather relatively close to the microphone in order to assure audio quality, and also must always be aware of the direction in which they are speaking. As a result, such systems intrude on the meeting. In addition, as the microphones are omni-directional and located on the tabletop, they can pick up and transmit to the remote participants undesirable ambient noise. Common sources of unwanted ambient noise include table noise, sidebar conversations, laptop keyboard clicks, coffee cup clinks, etc. These undesired audio sources can be very damaging to the efficiency, focus, and productivity of conference meetings, especially for far-end (remote) participants in the conference.

Applicants have disclosed novel systems and methods for overcoming these problems by using multiple wireless microphones in communication with a base station. Exemplary devices are disclosed in U.S. Pat. Pub. No. 2006/0217162 to Bodley et al. As more wireless microphones are introduced into a conference environment, however, additional base stations must also be deployed to communicate with the microphones. The growing number of devices (both microphones and base stations) can introduce problems by crowding the available RF (radio frequency) spectrum, especially where, for example, time division encoding of signals is employed.

Accordingly, there is a need for a simple system that can synchronize a plurality of base stations in a given conferencing environment so as to optimize the use of available RF spectrum and more efficiently support multiple wireless devices.

SUMMARY

The present invention provides systems and methods for synchronizing a clock used by multiple RF (radio frequency) base stations operating in TDD (Time Division Duplex) mode to optimize RF spectrum usage within an overlapping RF range in order to maximize the density of portable parts (e.g., wireless personal microphones, wireless speakers, etc.) associated with the base stations.

In one aspect of the invention, a method of synchronizing a clock used by a first base station in a wireless audio system is provided that includes scanning for a second base station for a predetermined period of time. If the second base station is found prior to the expiration of the predetermined period of time, the first base station checks a broadcast message from the second base station for a primary ID and compares the primary ID of the second base station to a unique identifier of the first base station. If the primary ID of the second base station does not match the unique identifier of the first base station, the first base station derives a clock signal from a signal produced by the secondary base station.

The systems and methods of the present invention can have a variety of modifications, additional features, and substitutions, all of which are considered within the scope of the invention. For example, in some embodiments, the first base station can derive a clock signal by synchronizing an internally generated clock signal with the signal produced by the second base station. In other embodiments, the first base station can derive a clock signal by utilizing the signal produced by the second base station as its own clock signal. Further, in some embodiments, the first base station can utilize an internally generated clock signal if the second base station is not detected within the predetermined period of time.

In other embodiments, the method can further include connecting the first base station to the second base station having the strongest signal if more than one second base station is found. In still other embodiments, the method can further include periodically repeating the step of scanning for the second base station.

In certain embodiments, sometimes depending on the RF hardware and/or software in the base station, normal base station operations can be stopped during the scanning step. In other embodiments, however, normal base station operations can be maintained during the scanning step.

In some embodiments, the method can further include retransmitting the primary ID of the second base station if the primary ID of the second base station does not match the unique identifier of the first base station.

In another aspect of the invention, a wireless audio conferencing system is provided that includes a primary base station utilizing an internally generated clock signal and one or more secondary base stations wirelessly coupled to the primary base station and configured to derive a clock signal from the primary base station. The primary base station is configured to periodically scan for additional base stations and, if an additional base station is found, the primary base station is configured to begin deriving a clock signal from the additional base station if a primary ID broadcast by the additional base station does not match a unique identifier of the primary base station.

In some embodiments, the primary base station can be further configured to release the one or more secondary base stations if the primary ID broadcast by the additional base station matches the unique identifier of the primary base station. In other embodiments, the primary base station can be further configured to retransmit the primary ID of the additional base station if the primary ID broadcast by the additional base station does not match the unique identifier of the primary base station.

Further, in some embodiments, the system can further include one or more portable devices for audio conferencing. The portable devices can, in some embodiments, be any of wireless speakers, wireless wearable microphones, and wireless table-top microphones.

BRIEF DESCRIPTION OF THE DRAWINGS

The aspects and embodiments of the invention described above will be more fully understood from the following detailed description taken in conjunction with the accompanying drawings, in which.

DETAILED DESCRIPTION

Certain exemplary embodiments will now be described to provide an overall understanding of the principles of the systems and methods disclosed herein. One or more examples of these embodiments are illustrated in the accompanying drawings. Those skilled in the art will understand that the systems and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

The terms "a" and "an" can be used interchangeably, and are equivalent to the phrase "one or more" as utilized in the present application. The terms "comprising," "having," "including," and "containing" are to be construed as open-ended terms (i.e., meaning "including, but not limited to,") unless otherwise noted. The terms "about" and "approximately" used for any numerical values or ranges indicate a suitable dimensional tolerance that allows the composition, part, or collection of elements to function for its intended purpose as described herein. These terms generally indicate a ±10% variation about a central value. Components described herein as being coupled may be directly coupled, or they may be indirectly coupled via one or more intermediate components. The recitation of any ranges of values herein is merely intended to serve as a shorthand method of referring individually to each separate value falling within the range, unless otherwise indicated herein, and each separate value is incorporated into the specification as if it were individually recited. All methods described herein can be performed in any suitable order unless otherwise indicated herein or otherwise clearly contradicted by context. The use of any and all examples, or exemplary language (e.g., "such as"), provided herein is intended merely to better illuminate the invention and does not impose a limitation on the scope of the invention unless otherwise claimed. No language in the specification should be construed as indicating any non-claimed element as essential to the practice of the invention.

The present invention generally provides systems and methods for synchronizing one or more base stations that can be utilized in, for example, a wireless audio system that includes one or more base stations in communication with one or more wireless microphones and wireless speakers. Exemplary wireless audio systems can include those described in U.S. patent application Ser. No. 11/360,922 filed on Feb. 23, 2006, and entitled "Wireless Multi-User Audio System," U.S. patent application Ser. No. 11/563,292 filed on Nov. 27, 2006, and entitled "Wireless Multi-User Audio System," U.S. patent application Ser. No. 11/668,235 filed on Jan. 29, 2007, and entitled "Wireless Multi-User Audio System," all of which are hereby incorporated by reference in their entirety.

Figure 1:
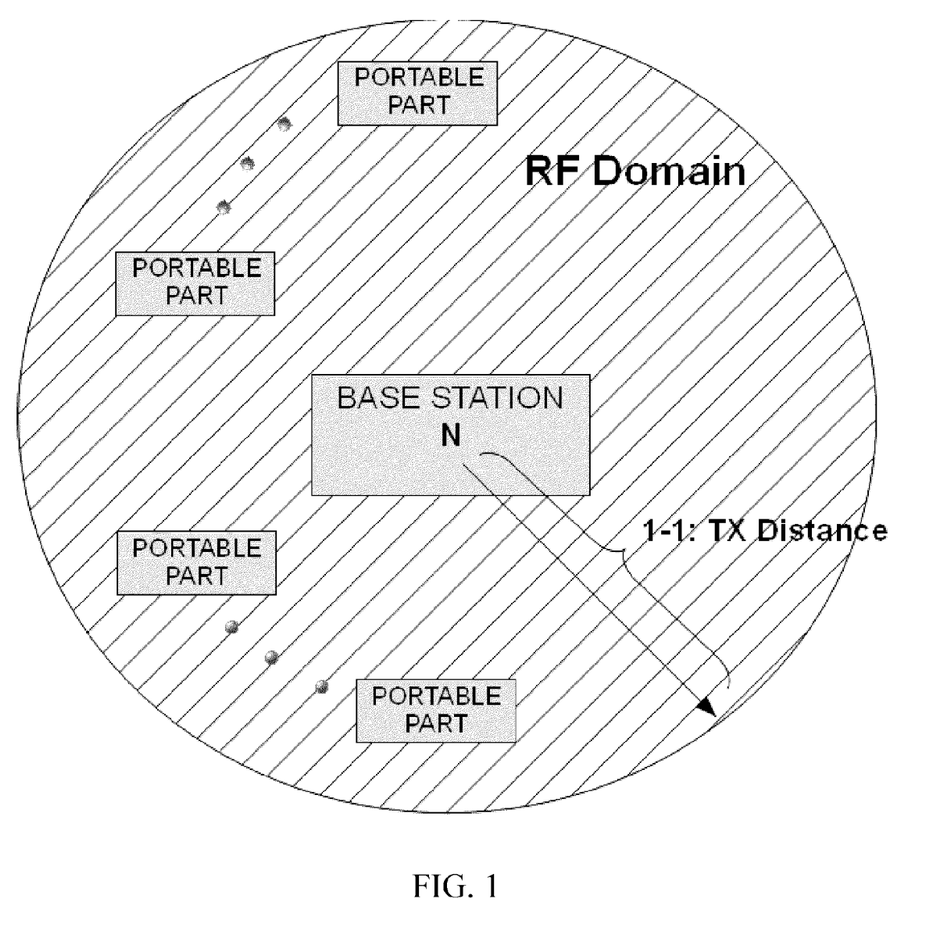
FIG. 1 is a schematic of one embodiment of a single base station configuration.
Figure 2:
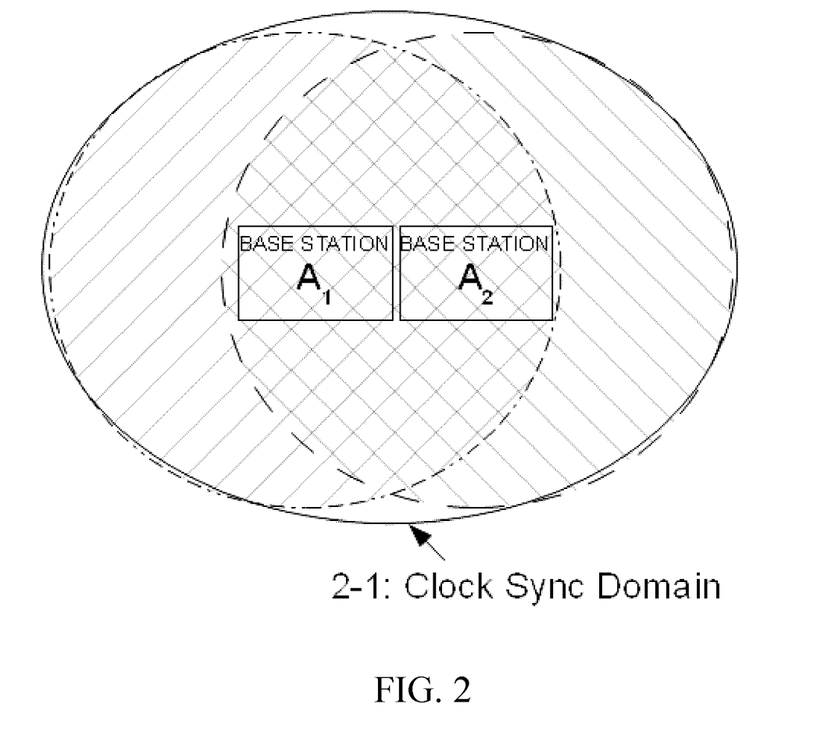
FIG. 2 is a schematic of one embodiment of a clock sync domain.

FIG. 1 depicts a single base station configuration. The system shown in FIG. 1 includes a base station N and a plurality of portable parts, each of which can be any of a variety of wireless audio conferencing devices, such as wireless microphones, wireless speakers, etc. The base station N shown in FIG. 1 has an RF range depicted by the circle with radius defined by the transmit distance of the base station 1-1. As multiple systems with multiple base stations are added to a location, their RF ranges can overlap as depicted in FIG. 2. As shown in FIG. 2, the set of systems with overlapping RF ranges is defined as a clock sync domain 2-1.

The term "primary base station" is used to refer to a base station that uses an internally generated clock for RF transmission, and the term "secondary base station" refers to a base station that derives its clock from a received RF transmission signal. Note that each clock sync domain can have a single primary base station. All other base stations that are members of a clock sync domain can be secondary base stations.

Figure 3:
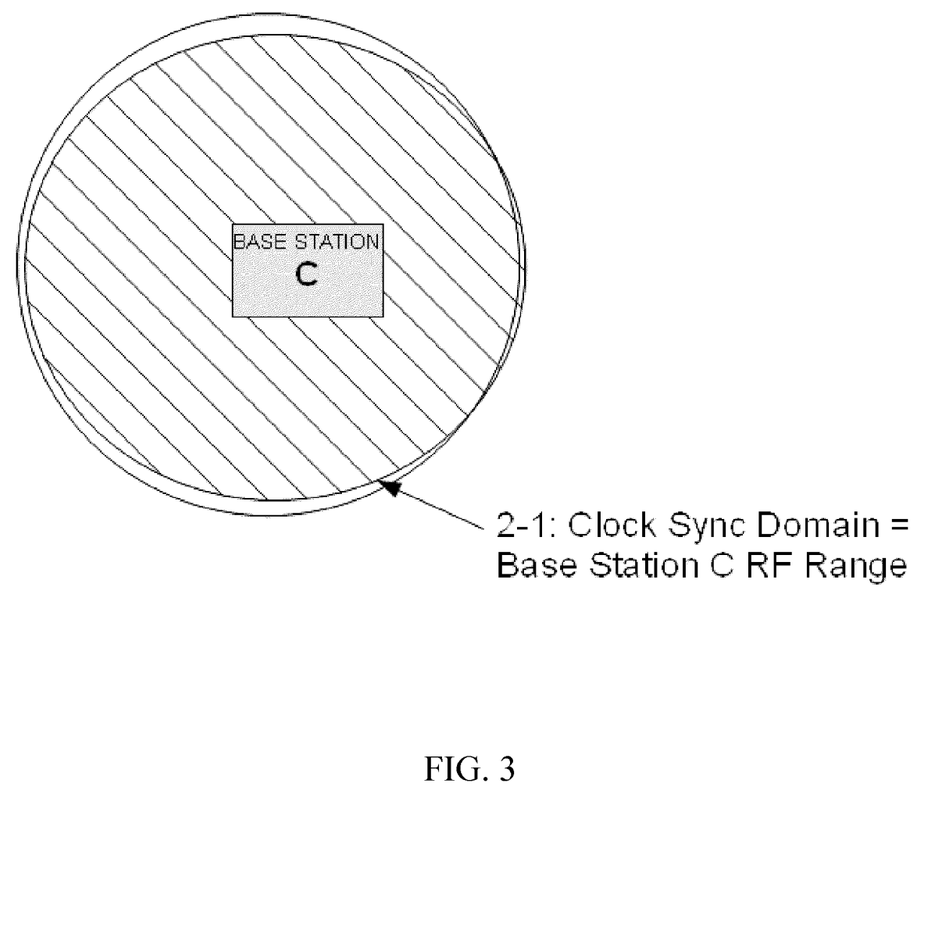
FIG. 3 is a schematic of one embodiment of a new clock sync domain.
Figure 4:
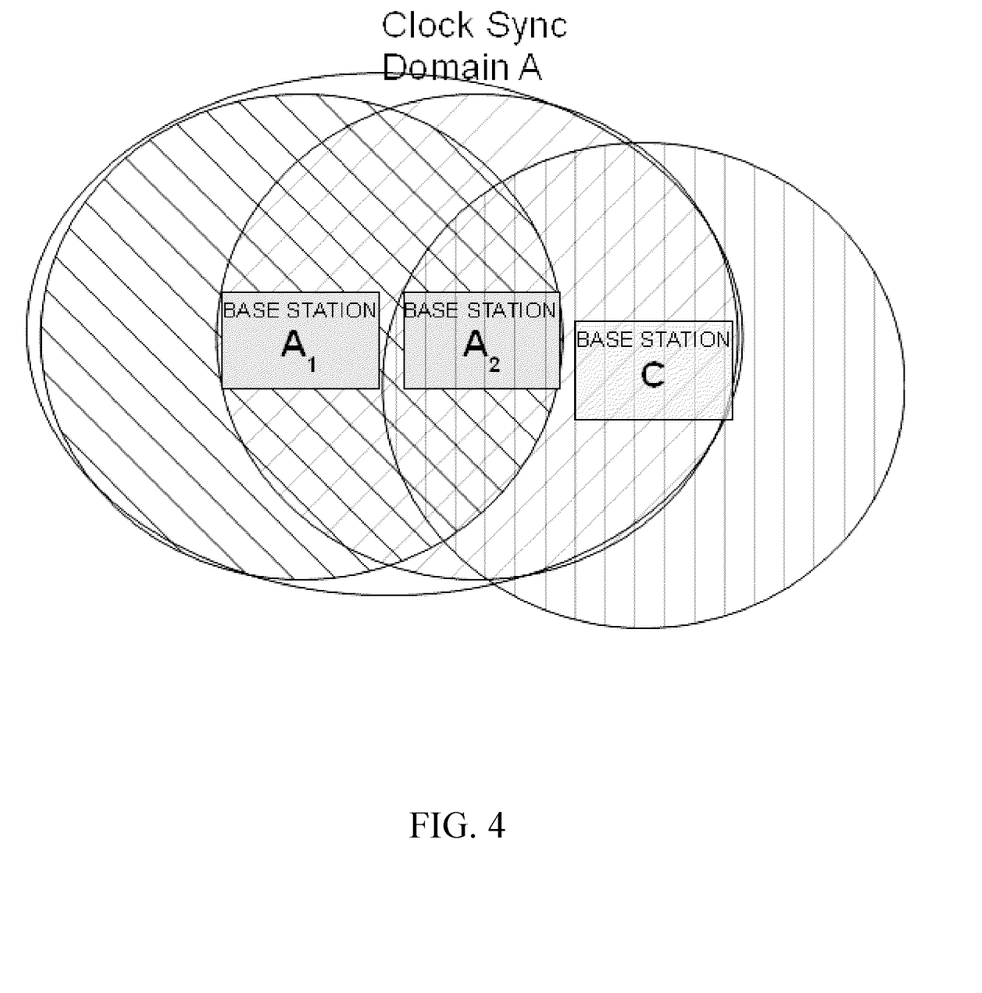
FIG. 4 is a schematic of one embodiment of extending a clock sync domain.
Figure 5:
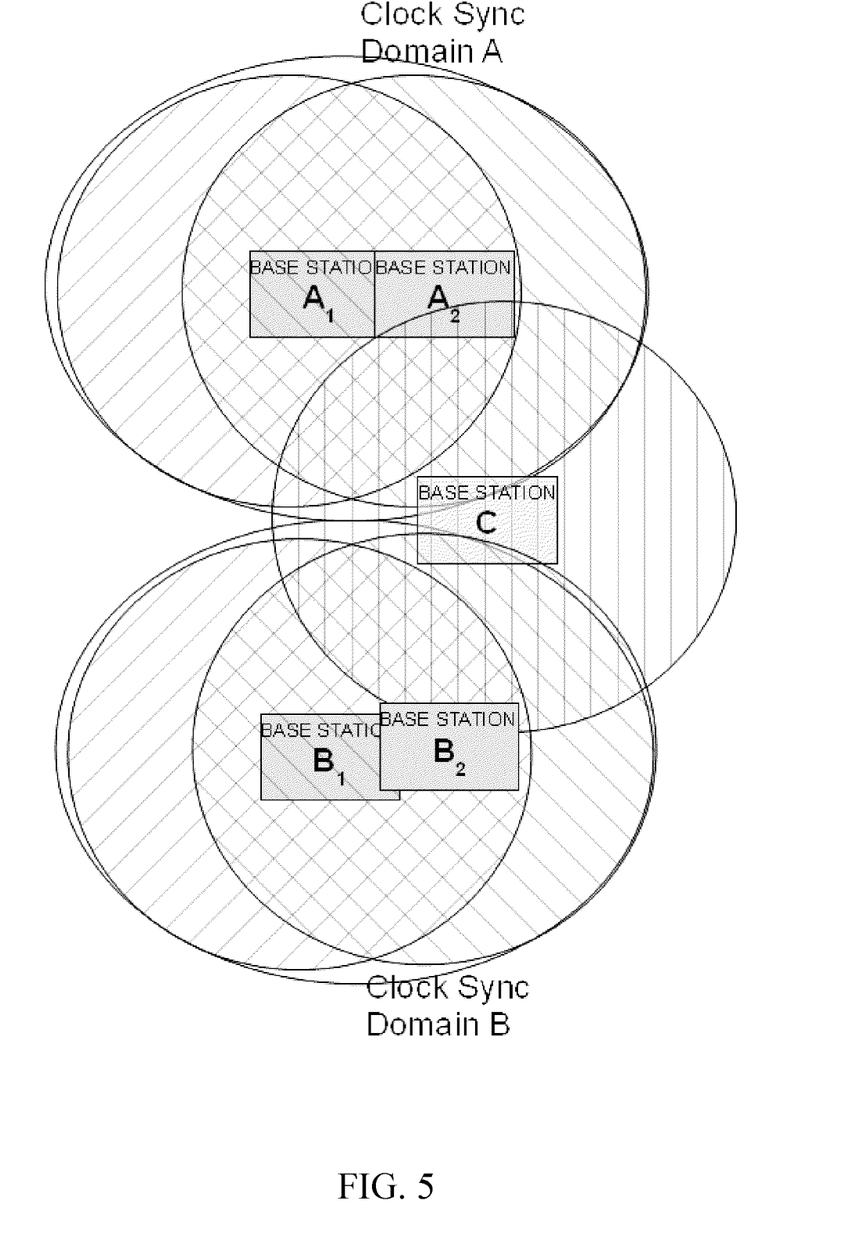
FIG. 5 is a schematic of one embodiment of overlapping clock sync domains.

The addition of a new base station to an RF range can:

Create a new clock sync domain (FIG. 3);

Extend an existing clock sync domain (FIG. 4); or

Overlap two existing clock sync domains requiring a merge of the domains (FIG. 5).

The present invention defines a technique for automatically identifying externally sourced base station clocks and merging overlapping clock sync domains, which can eliminate the need for complex base station system management and network configuration.

In order to synchronize a secondary base station's clock with a nearby base station's clock, the following can be accomplished:

The base station can track and lock to an external signal in a manner similar to the way a portable device locks to a base station. By adding portable device logic (i.e., the logic used by portable speakers and microphones to wirelessly detect and connect to a particular base station) to an existing base station implementation, the base station can scan for, track, and lock to an external clock signal. There are two solutions presented for the scan, track, and lock function:

1. A Shared Single Receiver—a single radio receiver sub-system can be shared between normal operations and the scan, track, and lock function. This solution can require a hybrid software stack which combines the base station and portable device functionality.

2. Dual Receiver—a second radio receiver sub-system can be added to scan for, track, and lock to an external clock signal in parallel with normal operations. With this solution, the normal operations software does not need to be changed, as the scan, track, and lock function can be implemented on the second radio receiver sub-system.

During power on, the base station can scan the environment to determine if there are other base stations around and lock to the nearest one. The nearest base station is defined to be the base station with the strongest signal. Normally, portable devices are configured to lock to a particular base station identifier. In this case, however, the base station can scan for all identifiers and pick the one with the highest radio signal strength.

Only after a successful lock, or after a timeout period indicating that no nearby base stations were found, can the base station start normal operations, including transmission of a beacon signal to allow portable devices to lock to it.

Once normal operations commence, sync to an unsynchronized base station can require the base station to periodically scan for and lock to unsynchronized base stations. This scan and lock function is dependent on the radio receiver configuration:

1. Shared Single Receiver—in order to do a scan of unsynchronized base stations, normal operation can be stopped for the time it takes to scan and lock to another base station, or a timeout occurs.

2. Dual Receiver—by adding a second radio receiver sub-system, the scan can be conducted in parallel with normal operations. When the base station is in normal operation and the second radio receiver sub-system locks to an unsynchronized system, it is possible to slowly shift the main radio receiver sub-system frame in order to synchronize it with the new reference. This procedure may take several minutes, but it will not interrupt normal operation.

During normal operations, if the base station is locked to another base station clock signal, it can keep this lock even when slots on either base station are allocated and/or de-allocated by connected portable devices. When the signal to which the base station is locked changes its slot, the receiving slot can be changed accordingly in order to maintain the lock. A secondary base station can ensure that it can track an external clock, even when the primary base station clock signal changes to a slot currently occupied by a portable device connected to the secondary base station.

Synchronization loops should be avoided where two or more base stations lock to each other without any of them being the frame of reference. Every base station, when locked to another base station, can transmit a special broadcast message with a unique identifier of the base station to which it is locked. In a case where the base station to which another base station is locked is already broadcasting a similar message, that message is simply retransmitted. When a primary base station locks to another base station and receives this special broadcast message, it checks if the identifier is its own identifier. In such a case it will simply abort the locking procedure and continue operating with its own reference clock.

During normal operation, if the base station is locked to another base station that is powered off, the initial base station must re-lock to another base station, if any others exist. When the base station loses lock, it can scan for another base station. If the new base station that it finds has the same frame of reference as the previous base station, there need not be any change in the generated synchronization signal. If the new base station has a different frame of reference, however, the base station can re-sync to the new frame of reference. As previously described, normal operations will be interrupted when implementing this scan and re-sync process in the shared single receiver solution, while in the dual receiver solution the function can be performed in the background during normal operation.

The over-the-air synchronization algorithm is summarized as follow:

OTA1. When a base station is powered up it defaults to primary mode and starts a periodic scan for other base stations.

OTA2. When a primary base station finds another base station, it checks the special broadcast message received from the detected base station for the unique identifier to which it is locked ("primary ID"). If the "primary ID" does not match its own identifier, the primary base station becomes secondary of the detected base station.

OTA3. Secondary base stations transmit a special broadcast message containing the "primary ID" to which they are locked. When a base station is not transmitting the "primary ID" message it is assumed to be a primary base station and the broadcast identifier will be used as "primary ID." A secondary base station locked to another secondary base station retransmits the "primary ID" message it receives from the base station to which it is locked.

OTA4. Primary base stations periodically scan the environment to check for the presence of other base stations. Secondary base stations do not scan the environment.

OTA5. If a secondary base station loses lock to the primary base station it becomes a primary base station.

OTA6. Primary base stations keep a counter of how many times they have switched from secondary to primary ("primary counter") and broadcast it together with the "primary ID" message.

OTA7. When a primary base station detects a secondary base station transmitting its own identifier in the "primary ID" message, the primary base station can periodically give up its primary status to become a secondary base station. Before switching to a secondary, the primary base station broadcasts a "primary release" message, indicating that it is becoming a secondary together with the id of the secondary base station that is to become the new primary base station for this clock sync domain.

OTA8. If a primary base station has reached the time to give up being a primary and finds more than one secondary base station transmitting its own id in the "primary ID" message, it will select the secondary base station with the smallest "primary counter" to become the next primary base station.

OTA9. When a secondary base station receives a "primary release" message, it becomes a primary base station.

The algorithm applies to the three scenarios related to adding a new base station C as follows:

EXAMPLE 1

Adding base station C will create a new clock sync domain, as in FIG. 3.

| Reference # | Action |
| --- | --- |
| OTA1 | When C is powered up, no neighboring systems are found during the scan for other base stations, thus the system will remain a primary base station and source its own clock. |

EXAMPLE 2

Adding base station C will extend an existing clock sync domain, as in FIG. 4.

| Reference # | Action |
| --- | --- |
| OTA1 | When base station C is powered up, neighboring systems are found during the scan for all other base stations (assume any system in sync domain A). |
| OTA2 | Base station C will determine that the "primary ID = $A_1$" of the detected systems does not match its own identifier and will become secondary of the detected base station. |
| OTA3 | Base station C will retransmit the "primary ID = $A_1$" received from the neighboring systems. |

EXAMPLE 3

Adding base station C will cause two existing clock sync domains to overlap, as in FIG. 5.

| Reference # | Action |
| --- | --- |
| OTA1 | When base station C is powered up, it defaults to primary mode and starts a periodic scan for other base stations. |
| OTA2 | Base station C finds a neighboring base from one of the two existing clock sync domains (assume base station $A_2$ from sync domain A), and it checks the special broadcast message received from $A_2$ for the unique identifier to which it is locked ("primary ID" does not match its own identifier, thus base station C becomes secondary of the detected base station. |
| OTA3 | Base station C starts transmitting a special broadcast message containing the "primary ID = $A_1$" to which they are locked. |
| OTA7 | Base station $B_1$ detects a secondary base station transmitting its own identifier in the "primary ID = $B_1$" message, and can give up its primary status to become a secondary base station. Before switching to secondary, base station $B_1$ broadcasts a ("primary release") message, indicating that it is becoming a secondary together with the ID ($B_2$) of the secondary base station that is to become the new primary for this clock sync domain. |
| OTA9 | When base station $B_2$ receives the "primary release" message, it becomes a primary base station for sync domain B. |
| OTA4 | Base station $B_2$, as the new primary in sync domain B, can periodically scan the environment to check for the presence of other base stations, and will discover base station C. $B_2$ can check the special broadcast message received from C for the unique identifier to which it is locked ("primary ID = $A_1$"). The "primary ID" does not match its own identifier, thus base station $B_2$ becomes secondary of base station C. Since $B_1$ was secondary of $B_2$, it will now be secondary to $A_1$. |

When a first base station is described as "becoming secondary" to a second base station above, it means that the first base station will both derive its clock signal from a signal produced by the second base station, and it will retransmit the primary ID of the second base station. The first base station can derive its clock signal from a signal produced by the second base station in a variety of ways. For example, the first base station can synchronize its own internally generated clock signal with the signal produced by the second base station. Alternatively, the first base station can actually utilize the signal produced by the second base station as its clock signal, thereby ignoring any internally produced clock signals for as long as the first base station is secondary to the second base station.

A person skilled in the art will appreciate that these types of systems can be used with a variety of wireless audio systems, including those described in U.S. patent application Ser. No. 11/360,922 filed on Feb. 23, 2006, and entitled "Wireless Multi-User Audio System," U.S. patent application Ser. No. 11/563,292 filed on Nov. 27, 2006, and entitled "Wireless Multi-User Audio System," U.S. patent application Ser. No. 11/668,235 filed on Jan. 29, 2007, and entitled "Wireless Multi-User Audio System," each of which is mentioned above and incorporated by reference in their entirety.

All papers and publications cited herein are hereby incorporated by reference in their entirety. One skilled in the art will appreciate further features and advantages of the invention based on the above-described embodiments. Accordingly, the invention is not to be limited by what has been particularly shown and described, except as indicated by the appended claims.

What is claimed is:

1. A method of synchronizing a clock used by a first base station in a wireless audio system, comprising:

scanning, by the first base station, for a second base station for a predetermined period of time;

detecting the second base station prior to expiration of the predetermined period of time and detecting a unique identifier assigned to the second base station in a broadcast message periodically transmitted by the second base station;

comparing by the first base station the unique identifier assigned to the second base station to a unique identifier assigned to the first base station; and if it is determined that the unique identifier assigned to the second base station is different than the unique identifier assigned to the first base station, then the first base station using a clock signal in the message broadcast by the second base station to derive a clock signal that is synchronized to the second base station clock and the first base station periodically broadcasting the unique identifier assigned to the second base station thereby creating a single clock synchronization domain comprising the first and the second base stations, and if it is determined that the unique identifier assigned to the second base station is the same as the unique identifier assigned to the first base station, then the clock used by the second base station is not synchronized to the clock used by the first base station.

2. The method of claim 1, wherein the first base station derives the clock signal by synchronizing an internally generated clock signal with the signal produced by the second base station.

3. The method of claim 1, wherein the first base station derives the clock signal by utilizing the signal produced by the second base station as its own clock signal.

4. The method of claim 1, wherein the first base station utilizes an internally generated clock signal if the second base station is not detected within the predetermined period of time.

5. The method of claim 1, further comprising, if more than one second base station is found, connecting the first base station to the second base station having a strongest signal.

6. The method of claim 1, further comprising periodically repeating the step of scanning for the second base station.

7. The method of claim 1, wherein normal base station operations are stopped during the scanning step.

8. The method of claim 1, wherein normal base station operations are maintained during the scanning step.

* * * * *